(12) United States Patent
Schmied

(10) Patent No.: US 7,362,095 B2
(45) Date of Patent: * Apr. 22, 2008

(54) ANGLE-MEASUREMENT DEVICE AND METHOD FOR FABRICATION THEREOF

(75) Inventor: Benno Schmied, Ludwigshafen (DE)

(73) Assignee: Carl Freudenberg KG (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/063,244

(22) Filed: Feb. 22, 2005

(65) Prior Publication Data

US 2005/0194968 A1    Sep. 8, 2005

(30) Foreign Application Priority Data

Mar. 3, 2004   (DE) .................. 10 2004 010 947

(51) Int. Cl.
 *G01B 7/30* (2006.01)
(52) U.S. Cl. .................................................. 324/207.25
(58) Field of Classification Search ........... 324/207.25, 324/173–174; 73/514.31, 514.39
See application file for complete search history.

(56) References Cited

U.S. PATENT DOCUMENTS

| | | | | |
|---|---|---|---|---|
| 3,788,924 | A * | 1/1974 | Kobayashi et al. | 156/249 |
| 5,621,369 | A * | 4/1997 | Gardner et al. | 335/302 |
| 5,734,266 | A * | 3/1998 | Spies | 324/207.22 |
| 6,502,757 | B1 * | 1/2003 | Iwamoto et al. | 235/494 |
| 6,823,725 | B2 * | 11/2004 | Lohberg | 73/116 |
| 7,019,515 | B2 * | 3/2006 | Sentoku | 324/207.25 |
| 2004/0169503 | A1 * | 9/2004 | Enomoto et al. | 324/207.2 |

* cited by examiner

*Primary Examiner*—Bot LeDynh
(74) *Attorney, Agent, or Firm*—Harness, Dickey & Pierce, P.L.C.

(57) ABSTRACT

An angle-measurement device comprising at least one first tracer and one second tracer wherein the tracers are disposed on a common backing and are divided from one another by a separation groove.

12 Claims, 1 Drawing Sheet

ANGLE-MEASUREMENT DEVICE AND METHOD FOR FABRICATION THEREOF

CROSS-REFERENCE TO RELATED APPLICATIONS

This application claims the benefit of German Patent Application 10 2004 010 947.8-42, filed Mar. 3, 2004. The disclosure of the above application is incorporated herein by reference.

FIELD OF THE INVENTION

The present invention relates to an angle-measurement device comprising at least one first tracer and one second tracer disposed on a common backing. The present invention also relates to a method for the fabrication of an angle-measurement device.

BACKGROUND OF THE INVENTION

Angle-measurement devices are used, for example, to measure the rotation speed of wheel hubs of motor vehicles. Such angle-measurement devices are generally known from DE G 93 07 156. The prior-art angle-measurement device comprises a metallic carrier body on which is disposed a tracer made of a thermoplastic material containing magnetized ferrite. Into the tracer is embossed a magnetic pattern which constitutes the active part of the angle-measurement device. The magnetic patterns are picked up by means of a sensor.

The measurement of the absolute movement and of the angular position when a shaft is at a standstill requires an angle-measurement device with several tracers coded with different pat-terns, for example as in the case of a vernier. Such a measuring principle is known from DE 100 38 296 A1. The phase difference between the differently magnetized tracers makes it possible to determine the absolute angular position of the shaft. A specific configuration for such an angle-measurement device is not known.

SUMMARY OF THE INVENTION

The object of the invention is to provide an angle-measurement device with several magnetized tracers.

To reach the objective, the angle-measurement device comprises at least one first and one second tracer disposed on a common backing. The tracers are divided from one another by a separation groove.

A simple separation groove makes it possible to achieve a functional separation of the differently magnetized tracers. In particular, this prevents an interaction among the tracers in marginal regions as a result of different magnetization. The material for the tracers can be uniform and can be applied to the backing as a single piece, after which it is separated in functional terms by the separation groove. In this manner, fabrication is simplified and made more economical.

In one embodiment, the tracers can be disposed on a cylindrical surface and act in a radial direction. The expansion of the angle-measurement device in the radial direction is then minor.

In another embodiment, the tracers can be disposed on a circular surface and act in an axial direction. In this embodiment, the expansion in the axial direction is minor.

The tracers can be magnetized with different patterns. In this manner, the angular position of the shaft can be determined also when the shaft is at a standstill, and the absolute angular position can be determined at any time, because this angular position can be clearly recognized from the coding of the patterns.

The material from which the two tracers are made can be identical. This results in simple and economical fabrication of the angle-measurement device, because both tracers can be applied to the backing in a single operation.

The material constituting the two tracers can be a ferrite-filled plastic. Ferrite-filled plastics are easy to process and flexible during shaping. The tracers remain elastic and are thus insensitive to the thermal expansion of the backing.

The initially set objective is also reached by use of a method for fabricating an angle-measurement device whereby in a first operational step only one tracer is applied to the backing, in a second operational step the tracer is divided into several tracers by creation of a separation groove, and in a third operational step the tracers are magnetized independently of each other.

As a result of the fact that only a single ferrite-filled plastic material is injection-molded onto the backing, no special mechanisms or special tools are needed to fabricate several tracers, and this simplifies the fabrication. The separation groove can be cut by simple and inexpensive methods, for example by turning on a lathe or by milling. The separation groove prevents electromagnetic interaction between the separated tracers. The tracers can then be magnetized independently of each other with a magnetic pattern, wherein the magnetic pattern of the tracers possibly is different.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

In the following, a few exemplary embodiments of the angle-measurement device of the invention will be described in greater detail by reference to the drawings which show schematically the following.

DETAILED DESCRIPTION OF THE PREFERRED EMBODIMENTS

The following description of the preferred embodiment(s) is merely exemplary in nature and is in no way intended to limit the invention, its application, or uses.

Figure 1:
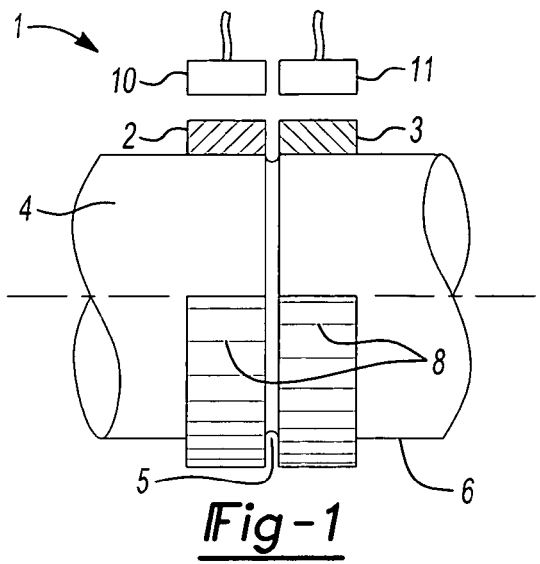
FIG. 1 shows an angle-measurement device according to a principle of the present invention acting in the radial direction.

FIG. 1 shows an angle-measurement device 1 with a backing 4 provided with two tracers 2 and 3 that consist of a ferrite-filled plastic. The tracers 2 and 3 act radially and are cured onto the cylindrical surface 6 of the backing 4. The two tracers 2 and 3 are separated from one another by a separation groove 5 that is formed with a lathe. To tracers 2 and 3 is applied a magnetic pattern 8 which is picked up by sensors 10 and 11. The different arrangement of the pattern 8 on the two tracers 2 and 3 makes it possible to determine the absolute angle position.

Figure 2:
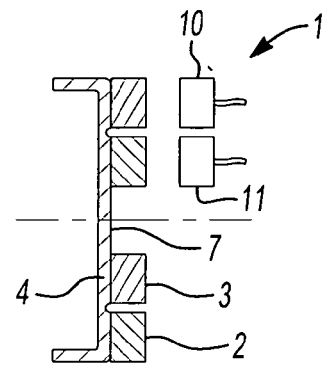
FIG. 2 shows an angle-measurement device according to a principle of the present invention acting in the axial direction.

FIG. 2 shows an angle-measurement device 1 with a backing 4 and two tracers 2 and 3 made of a ferrite-filled plastic. The tracers 2 and 3 act in the axial direction and are cured onto the circular surface 7 of the backing 4. The two tracers 2 and 3 are separated from one another by a separation groove 5. To the tracers 2 and 3 is applied a magnetic pattern 8 which is detected by sensors 10 and 11.

Figure 3:
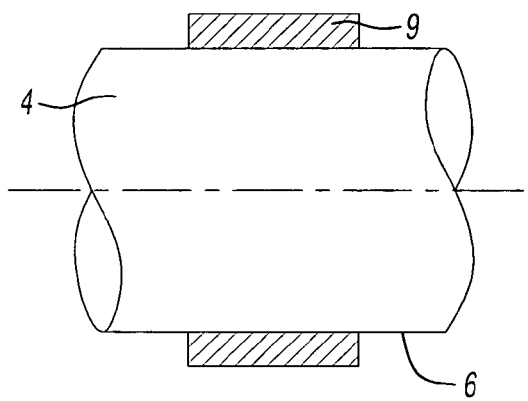
FIG. 3 shows a backing around which a ferrite-filled plastic was injection-molded according to a principle of the present invention.

FIG. 3 shows a backing 4 with a single tracer 9 cured onto the cylindrical surface 6 thereof. The tracer 9 acts in the radial direction. The tracer 9 consists of a ferrite-filled plastic and provides a base for the creation of several mutually independent tracers.

Figure 4:
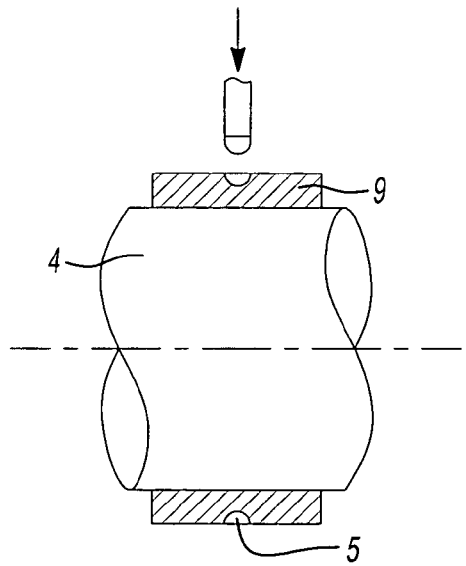
FIG. 4 shows the cutting of the separation groove according to a principle of the present invention.

FIG. 4 shows the application of the separation groove 5 to the tracer 9 shown in FIG. 3 by turning on a lathe. The tracer 9 is completely separated to form two tracers 2 and 3 which are magnetized independently of each other without electromagnetic interactions.

Figure 5:
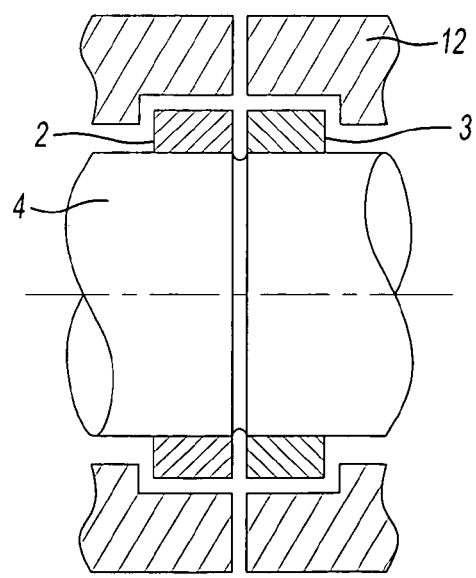
FIG. 5 shows the tracer-magnetization process according to a principle of the present invention.

FIG. 5 shows the magnetization process in which magnetization tool 12 applies a magnetic pattern 8 to each of tracers 2 and 3 shown in FIG. 4.

The description of the invention is merely exemplary in nature and, thus, variations that do not depart from the gist of the invention are intended to be within the scope of the invention. Such variations are not to be regarded as a departure from the spirit and scope of the invention.

The invention claimed is:

1. An angle-measurement device comprising:
a backing element having a cylindrical surface;
a first tracer formed on said cylindrical surface of said backing element, said first tracer being continually formed around an entire circumference of said cylindrical surface;
a second tracer disposed on said cylindrical surface of said backing element, said second tracer continually formed around said entire circumference of said cylindrical surface
said first and second tracers being separated from one another by a separation groove,
wherein said first and second tracers each include a different magnetization pattern; and
the device is fabricated by applying to said backing a single tracer consisting of a single piece of uniform material and then applying said separation groove to separate said single tracer into said first and second tracers.

2. The angle-measurement device as defined in claim 1, wherein said first and second tracers disposed on said cylindrical surface act in a radial direction.

3. The angle-measurement device as defined in claim 1, wherein said first and second tracers are comprised of the same material.

4. The angle-measurement device as defined in claim 1, wherein said first and second tracers are comprised of a ferrite-filled plastic.

5. An angle-measurement device comprising:
a backing element having a circular surface;
a first tracer formed on said circular surface of said backing element, said first tracer continually formed around an entire circumference of said circular surface;
a second tracer disposed on said circular surface of said backing element, said second tracer continually formed around said entire circumference of said circular surface;
said first and second tracers being separated from one another by a separation groove,
wherein said first and second tracers each include a different magnetization pattern.

6. The angle-measurement device as defined in claim 5, wherein said first and second tracers disposed on said circular surface act in a radial direction.

7. The angle-measurement device as defined in claim 5, wherein said first and second tracers are comprised of the same material.

8. The angle-measurement device as defined in claim 5, wherein said first and second tracers are comprised of a ferrite-filled plastic.

9. The angle-measurement device of claim 1, wherein said magnetization pattern of said first and second tracers are formed of a plurality of a magnetic regions.

10. The angle-measurement device of claim 5, wherein said magnetization pattern of said first and second tracers are formed of a plurality of magnetic regions.

11. The angle-measurement device of claim 1, wherein said separation groove is a linear groove that continually travels around said circumference.

12. The angle-measurement device of claim 5, wherein said separation groove is a linear groove that continually travels around said circumference.

* * * * *